United States Patent
Joseph

(10) Patent No.: US 9,642,314 B1
(45) Date of Patent: May 9, 2017

(54) PLANT STAND WITH MULTIPLE LIGHTING DEVICES AND PLANT HOLDERS

(71) Applicant: Lijo Joseph, Skokie, IL (US)

(72) Inventor: Lijo Joseph, Skokie, IL (US)

( * ) Notice: Subject to any disclaimer, the term of this patent is extended or adjusted under 35 U.S.C. 154(b) by 71 days.

(21) Appl. No.: 14/723,936

(22) Filed: May 28, 2015

Related U.S. Application Data

(60) Provisional application No. 62/008,015, filed on Jun. 5, 2014.

(51) Int. Cl.
*A01G 9/02* (2006.01)
*A01G 7/04* (2006.01)

(52) U.S. Cl.
CPC .............. *A01G 9/023* (2013.01); *A01G 7/045* (2013.01)

(58) Field of Classification Search
CPC ........ A01G 9/023; A01G 9/024; A01G 9/022; A01G 9/20; A01G 9/1066; A47G 7/047; A47G 7/044; A47G 7/045
USPC ............................................ 47/67, 68, 83, 86
See application file for complete search history.

(56) References Cited

U.S. PATENT DOCUMENTS

| | | | | |
|---|---|---|---|---|
| 214,061 A * | 4/1879 | Stearns | ................... | A47G 7/047 211/77 |
| 2,720,056 A * | 10/1955 | Levy | ....................... | A47G 7/044 362/122 |
| 3,015,024 A * | 12/1961 | Charchan | ................. | A01G 9/12 174/38 |
| 3,018,898 A * | 1/1962 | Frazelle | ............. | A47B 96/1425 211/107 |
| 4,250,666 A * | 2/1981 | Rakestraw | ............. | A01G 7/045 211/131.1 |
| 4,349,864 A | 9/1982 | Smith | | |
| 4,513,531 A * | 4/1985 | Lestraden | .............. | A01G 9/143 47/17 |
| 5,347,751 A | 9/1994 | Carpay | | |
| 5,454,187 A * | 10/1995 | Wasserman | ............ | A01G 7/045 47/39 |
| 5,675,931 A * | 10/1997 | Wasserman | ............ | A47G 7/041 211/78 |
| 5,987,812 A | 11/1999 | Knell | | |

(Continued)

FOREIGN PATENT DOCUMENTS

WO    WO2009042979    7/2009

OTHER PUBLICATIONS

Grow Light Plant Stands, Plant Grow Lights, Grow Light Systems, http://www.mrlight.com/catalog/Grow_Lights/Grow_Light_Plant_Stands.html.

(Continued)

*Primary Examiner* — Kristen C Hayes
(74) *Attorney, Agent, or Firm* — Depeng Bi; Law Offices of Konrad Sherinian

(57) ABSTRACT

A plant stand includes one or more light subsystems and one or more corresponding plant holder subsystems. Each light subsystem includes two lighting devices for providing light to plants contained in a corresponding plant holder of a plant holder subsystem. The lighting devices are adapted to be tilted for adjusting the illumination projected onto the plants. The subsystems are attached to a frame supported by a stand subsystem sitting on a flat surface. The frame incorporates a top end for hanging the plant stand. The frame further incorporates multiple apertures for attaching the subsystems at different heights.

12 Claims, 6 Drawing Sheets

(56) References Cited

U.S. PATENT DOCUMENTS

| | | | |
|---|---|---|---|
| 6,230,437 B1 | 5/2001 | Wolverton et al. | |
| 6,477,805 B2 * | 11/2002 | Ware | A01G 31/02 47/83 |
| 6,615,542 B2 * | 9/2003 | Ware | A01G 31/02 47/83 |
| 6,964,130 B1 | 11/2005 | Hartelius | |
| 7,040,053 B1 * | 5/2006 | Beesley | A01G 9/023 47/39 |
| 7,699,487 B2 | 4/2010 | Schafer | |
| 8,132,366 B1 * | 3/2012 | LeBlanc | A01C 1/02 211/124 |
| 8,356,445 B1 | 1/2013 | Colquhoun | |
| 2012/0318936 A1 | 12/2012 | Lutz | |

OTHER PUBLICATIONS

Sonnylight LED kitchen garden provides indoor container garden with led grow lights, http://sonnylightled.com/.

Eco-Source.com—quality products that don't cost the earth, http://eco-source.com/.

Home of the AeroGarden From AeroGrow International, http://www.aerogrow.com/.

* cited by examiner

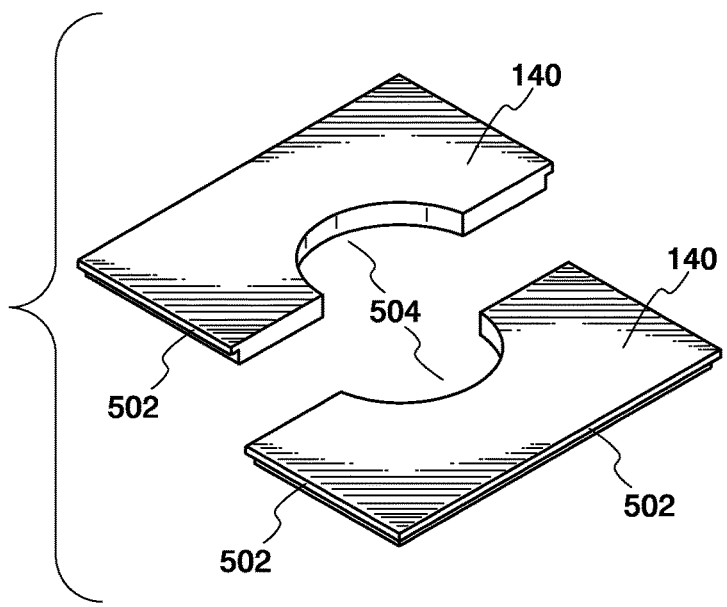
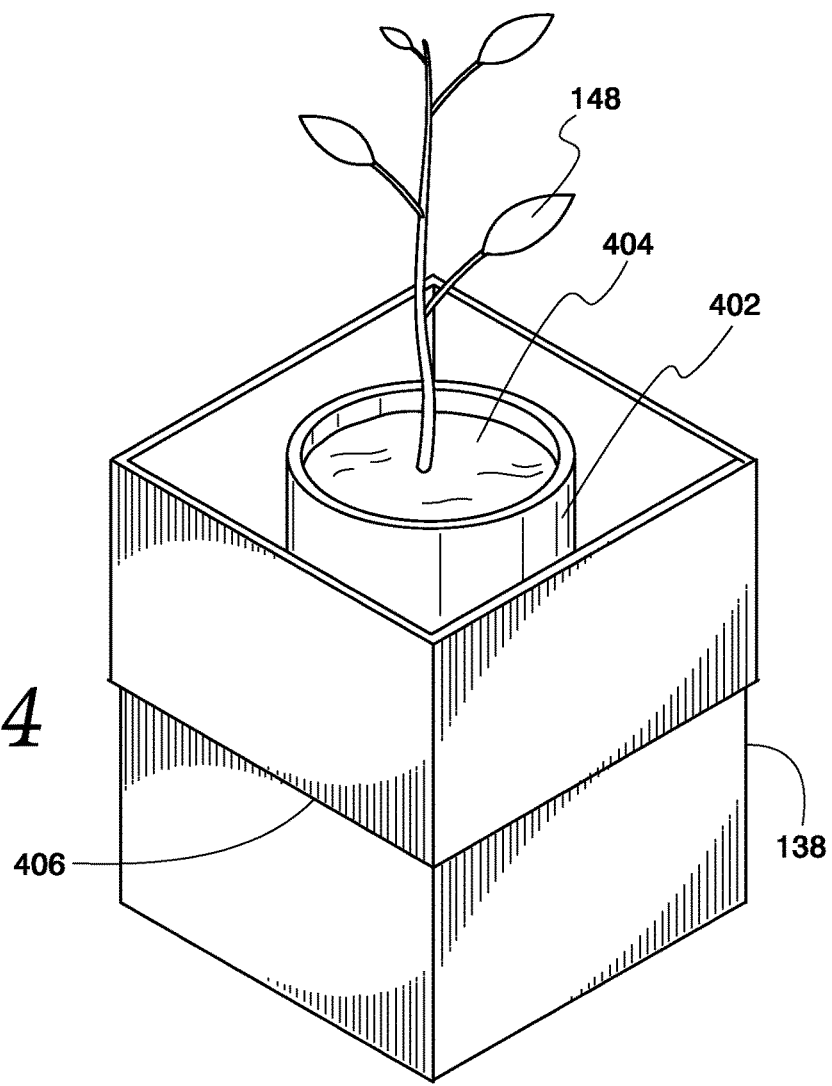

US 9,642,314 B1

PLANT STAND WITH MULTIPLE LIGHTING DEVICES AND PLANT HOLDERS

CROSS REFERENCE TO RELATED APPLICATIONS

This application claims the benefit and priority of U.S. Patent Application No. 62/008,015, entitled "PLANT STAND WITH MULTIPLE LIGHTING DEVICES AND PLANT HOLDERS," filed Jun. 5, 2014, which is hereby incorporated by reference in its entirety.

FIELD OF THE DISCLOSURE

The present invention relates to a plant stand, and more particularly relates to a plant stand with multiple lighting devices and corresponding plant holders. More particularly still, the present invention relates to a portable plant stand with plant holders adapted to hold different plant containers.

DESCRIPTION OF BACKGROUND

Indoor gardening provides numerous benefits. It allows people to enjoy and appreciate plants (including floral plants herb, small fruits and vegetables) year round inside their residencies and offices. Indoor gardening is also feasible in both warn and cold climates. Plants need light to grow. Accordingly, plant stands with lighting devices as sources of light have been proposed and become commercially available for growing plants. For example, U.S. Pat. No. 6,230,437 and U.S. Pat. No. 7,699,487 each propose a plant stand.

The lighting devices, such as LED (Light-Emitting Diode) lighting devices, provide desired light wavelengths for rapid plant growth. The LED lighting devices are built to provide light of different colors, such as red, orange, blue, green, purple, etc. The state of art plant stands are designed to be placed on, for example, a floor, office desk, kitchen counter, etc. However, the conventional plant stands present numerous shortcomings. For one, a conventional plant stand is designed to be used in a single style, such as being placed on a desk or a cart. It is oftentimes desirable to have a plant stand that can be placed on a flat surface, and hung on an indoor structure, such as a ceiling. Additionally, a conventional plant stand fails to provide a feature allowing the adjustment of illumination that a plant receives while sitting on the plant stand.

Furthermore, a conventional plant stand provides a single lighting device for a single plant (or a single plant container), or a collection of lighting devices for a collection of plants. The collection of lighting devices and the collection of plants are not arranged in corresponding pairs. Moreover, a conventional plant stand fails to provide a set (meaning one or more) of plant holders for holding a corresponding set of plant containers. A plant holder provides the benefit of sanitation because a user does not have to handle soil directly when the plant is placed on the plant stand. Another benefit that the plant holder provides is that it can be used for plants growing in soil, water, or any other types of material.

Accordingly, there is a need for a plant stand overcoming the shortcomings of the conventional plant stands. More particular, there is a need for a plant stand that incorporates a set of lighting devices and a corresponding set of plant holders. The heights of the lighting devices and the plant holders can be adjusted on the plant stand. In addition, the plant stand can be placed on a flat surface or hung on a structure.

OBJECTS OF THE DISCLOSED SYSTEM, METHOD, AND APPARATUS

Accordingly, it is an object of this disclosure to provide a plant stand adapted to be placed on a flat surface and hung up.

Another object of this disclosure is to provide a plant stand that includes a set of lighting devices and a corresponding set of plant holders.

Another object of this disclosure is to provide a plant stand that includes a set of lighting devices and a corresponding set of plant holders that can be attached to a frame at different heights.

Another object of this disclosure is to provide a plant stand that includes a set of lighting devices and a corresponding set of plant holders arranged in different alignments.

Another object of this disclosure is to provide a plant stand that includes a set of lighting devices, each of which adapted to be tilted along a frame for adjusting the amount of illumination it produces for plants disposed in a corresponding plant holder.

Another object of this disclosure is to provide a plant stand that includes a set of plant holders, each of which including two removable covers.

Other advantages of this disclosure will be clear to a person of ordinary skill in the art. It should be understood, however, that a system or method could practice the disclosure while not achieving all of the enumerated advantages, and that the protected disclosure is defined by the claims.

SUMMARY OF THE DISCLOSURE

Generally speaking, pursuant to the various embodiments, the present disclosure provides a plant stand for growing plants. The plant stand is adapted to be placed on a flat surface using a stand subsystem, or hung in the air using a hook extended upward from a frame of the plant stand. The frame is operatively coupled to the stand subsystem. The plant stand further includes a set of light subsystems attached to the frame. Each light subsystem includes two or more lighting devices for generating light. In addition, the plant stand further includes a set of plant holder subsystems attached to the frame. Each plant holder includes two or more plant holders corresponding to the lighting devices. Each plant holder is adapted to hold a plant container, and includes removable two covers. The covers form a center opening for receiving a plant disposed within the plant container.

BRIEF DESCRIPTION OF THE DRAWINGS

Although the characteristic features of this disclosure will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

FIG. 4 is a front perspective view of a plant holder of a plant stand system in accordance with the teachings of this disclosure;

FIG. 5 is a front perspective view of two covers for a plant holder of a plant stand system in accordance with the teachings of this disclosure;

A person of ordinary skills in the art will appreciate that elements of the figures above are illustrated for simplicity and clarity, and are not necessarily drawn to scale. The dimensions of some elements in the figures may have been exaggerated relative to other elements to help understanding of the present teachings. Furthermore, a particular order in which certain elements, parts, components, modules, steps, actions, events and/or processes are described or illustrated may not be actually required. A person of ordinary skills in the art will appreciate that, for the purpose of simplicity and clarity of illustration, some commonly known and well-understood elements that are useful and/or necessary in a commercially feasible embodiment may not be depicted in order to provide a clear view of various embodiments in accordance with the present teachings.

DETAILED DESCRIPTION

Figure 1:
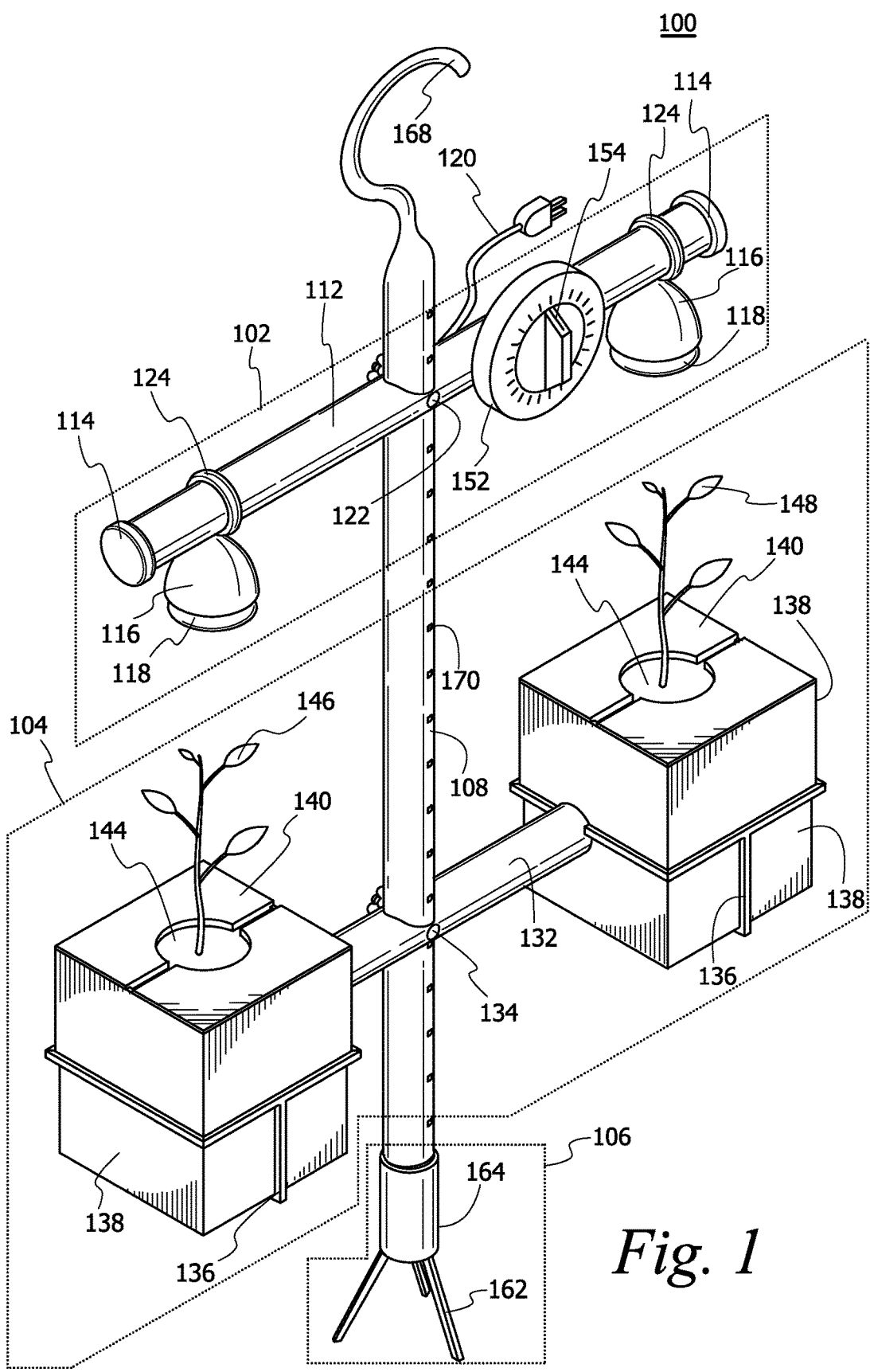
FIG. 1 is a front perspective view of a plant stand system in accordance with the teachings of this disclosure.

Turning to the Figures and to FIG. 1 in particular, a front perspective view of a plant stand is shown and generally indicated at 100. The illustrative plant stand 100 includes a center frame 108, a light subsystem 102 attached to the frame 108, a plant holder subsystem 104 attached to the frame 108, and a stand subsystem 106 supporting the frame 108. In one implementation, a top end 168 of the frame 108 is a hook for hanging the plant stand 100 on a different structure, such as a rod or a hook extending downward from a ceiling. Alternatively, the end 168 is a closed ring or a set of hooks for hanging the plant stand 100. A lower end of the frame 108 is operatively coupled to the stand subsystem 106, which includes a body 164 resting on top of three legs 162. The stand subsystem 106 supports the weight of the frame 108, and the subsystems 102 and 104. In addition, the stand subsystem 106 functions as a stable base for the plant stand 100. The lower end of the frame 108 is, for example, inserted or threaded into the body 164.

The light subsystem 102 includes a frame 112 with two end stoppers 114, and two lighting devices 116 attached to the frame 112. A power cord 120 extends inside the internal chamber of the frame 112 to be wired to the lighting devices 116 respectively. The opposite end of the power cord 120 is adapted to be plugged into a power outlet, such as an 110 v or 220 v power outlet. Each of the two lighting devices 116 is adapted to receive two lamps 118, such as LED lamps, fluorescent lamps. For example, the lighting devices 116 each incorporate a socket for receiving a lamp 118. The sockets are wired to the power cord 120. The lamp 118 can be inserted or threaded into the socket. The lighting devices 116 each are attached to the frame 112 through, for example, a clamp 124. The attaching device 124 is frictionally engaged with the frame 112. The frictional engagement allows the lighting devices 116 to be tilted around the frame 112.

In one implementation, the frame 112 is inserted through the central openings of the clamps 124 before the stoppers 114 are attached to the frame 112. The stoppers 114 can be, for example, flexible rubber caps. The mounting mechanism by which the light subsystem 102 is attached to the frame 108 is further illustrated by reference to FIG. 2.

Figure 2:
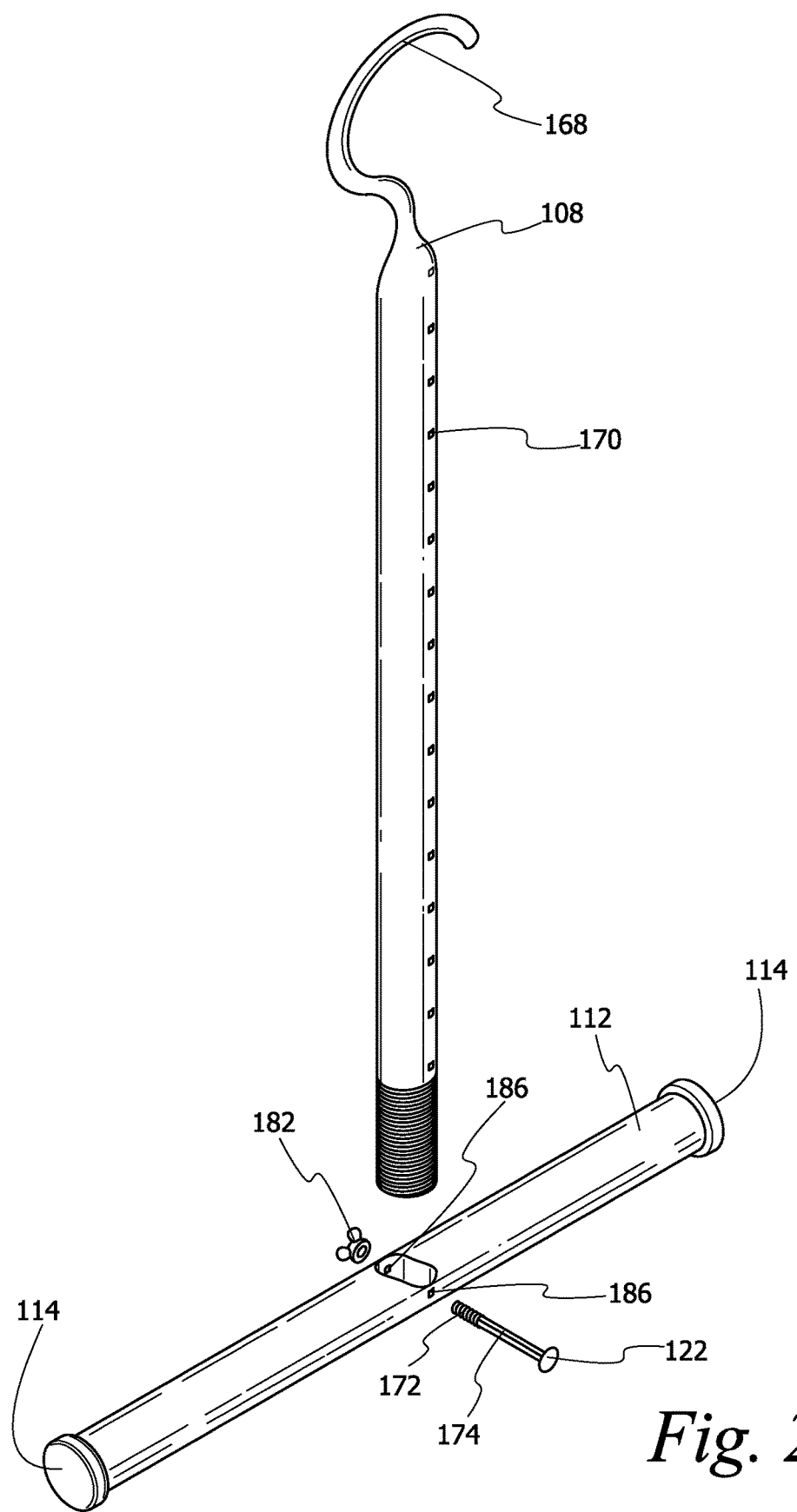
FIG. 2 is an exploded view of a plant stand system in accordance with the teachings of this disclosure.

Referring to FIG. 2, an exploded view of the light subsystem and the frame 108 is illustrated. The frame 112 incorporates a center vertical aperture 184 and a center horizontal aperture 186, each of which extending through the full diameter of the frame 112. The apertures 184 and 186 interconnect with each other. The aperture 184 is adapted to receive the frame 108. After the frame 108 is inserted into and through the aperture 184, the aperture 186 is aligned with one of the apertures 170 along the frame 108. A bolt 122 is then inserted into the aperture 186 and the aperture 170 at a selected height along the frame 108. A threaded hexagonal nut 182 is attached to a threaded portion 172 of the bolt 122 to affix the frame 112 to the frame 108. To maintain a horizontal position of the frame 112 when it is attached to the frame 108, the apertures 186 and 170 are constructed in a shape of a prism or cube with substantially the same size. Similarly, the bolt 122 includes a matching prism or cube portion 174 that has a length same as or close to the length of the aperture 186.

Turning back to FIG. 2, the plant holder subsystem 104 includes a frame 132 attached to the frame 108 using a bolt 134, and two brackets 136 mounted to the frame 132 by, for example welding. Alternatively, the frame 132 and the brackets 136 are integral parts of a single structure. The brackets 136 can be constructed in different geometric shapes, such as a cube, prism, or cylinder. The brackets 136 are adapted to host two plant holders 138, each of which including two covers 140. When the two covers 140 are placed on the holder 138 and aligned, a center opening 144 is formed for receiving a plant 146 or 148.

Figure 3:
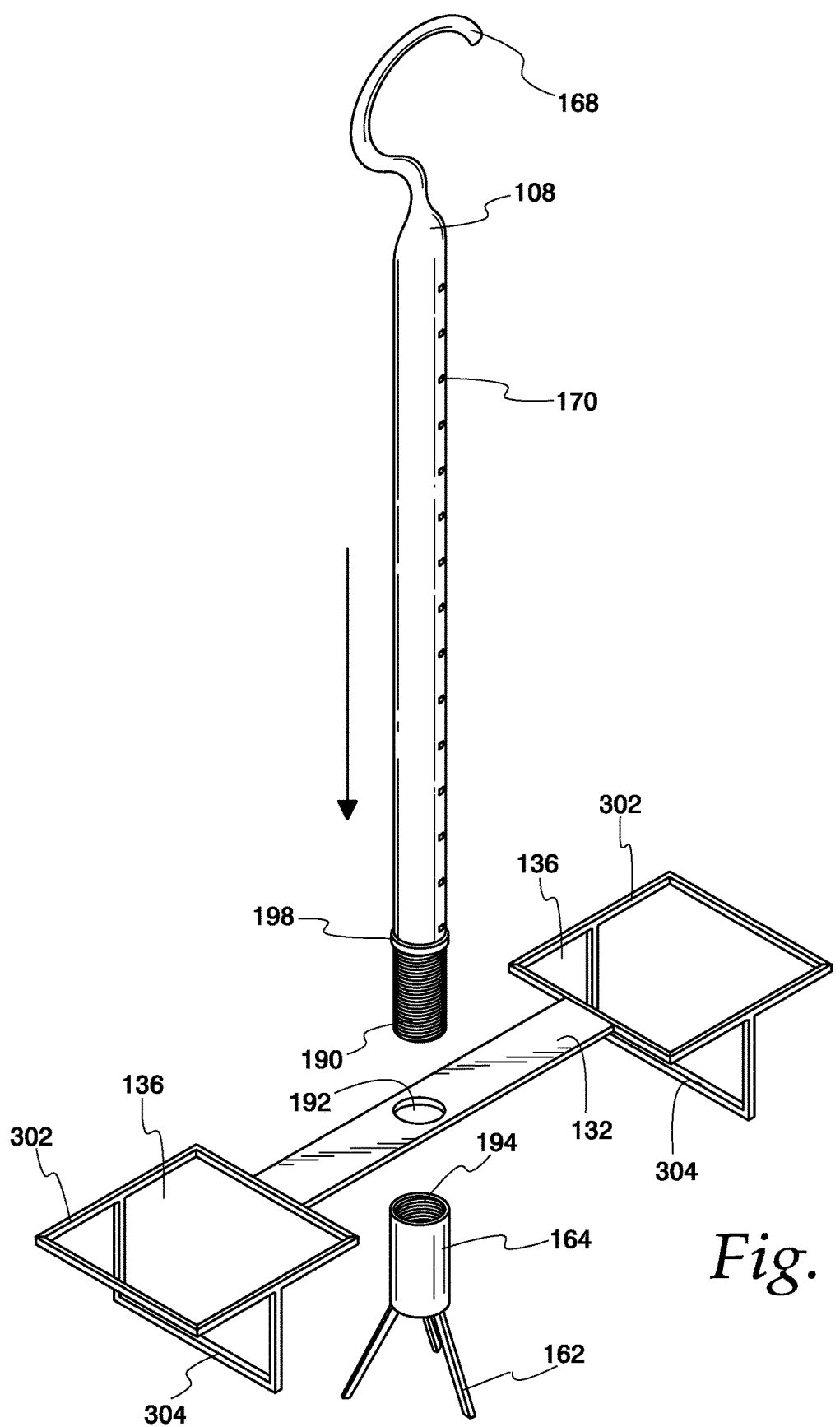
FIG. 3 is an exploded view of a plant stand system in accordance with the teachings of this disclosure.

In one implementation, the frame 132 is attached to the frame 108 using the same mechanism by which the frame 112 is attached to the frame 108. Alternatively, the frame 132 is attached to the frame 108 using a different mechanism as shown in FIG. 3. Referring to FIG. 3, an exploded view of the plant holder subsystem 104, the stand subsystem 106 and the frame 108 is illustrated. The body 164 incorporates a cavity 194 with a threaded surface. The cavity 194 is adapted to receive a threaded lower end 190 of the frame 108. The frame 132 incorporates a center aperture 192, through which the end 190 is inserted into the cavity 194. The frame 132 rests inside the body 164. To prevent movement of the frame 132 around the frame 108 after the frame 108 is coupled to the body 164, a stopper (such as a nut) 198 is attached or mounted to the frame 108. The stopper 198 makes contact with the frame 132 after the frame 108 is attached to the body 164.

It should be noted that the lower end 190 can be constructed without the threads. In such a case, the frame 132 is freely inserted into and removed from the stand subsystem 106. Moreover, when the plant stand 100 is hung onto a different structure, the stand 106 separated from the frame 108 and left behind.

The brackets 136 each include a horizontal frame 302 and a vertical frame 304. In a further implementation, the brackets 136 each include an additional vertical frame perpendicular to the frame 304. In a different implementation, the vertical frame 304 is not present. In such a case, the holder 138 embodies, for example, a tapered shape for resting inside and on the horizontal frame 302. As an additional example, the holder 138 incorporates a projecting edge for sitting on the horizontal frame 302.

Turning back to FIG. 3, the frame 302 is in a square shape. Alternatively, the frame 302 is constructed in a rectangular, circular, or oval shape. In a different implementation, the bracket 136 is a holder in the shape of a cube, prism or cylinder. In such a case, the holder has a bottom mounted to the sides of the holder. In a further implementation, the plant holder 138 and the bracket 136 are integral parts of a single device. In a still further implementation, plant holder 138 is mounted to the frame 132 and the bracket 136 is not present.

Referring now to FIGS. 4 and 5, the plant holder 138 and the covers 140 are shown. In the illustrative implementation, the plant holder 138 has a bottom and four sides. In one implementation, the plant holder 138 incorporates a projecting edge 406 by which the plant holder rests on the frame 302. An upper portion of the plant holder 138 is above the edge 406, while a lower portion of the plant holder 138 is below the edge 406. The upper portion has a bigger length and/or width than the lower portion such that the plant holder 138 is able to sit on the frame 302. A plant container 402 containing the plant 148 is placed into the plant folder 138. The plant container 402 also contains soil or water 404 for growing the plant 148. With the plant holder 138 being different and separate from the container 402, the plant holder 138 is able to hold any type of plant containers without making contact with the soil or water 404 (also referred to herein as fertile material). In addition, a user of the plant stand 100 does not have to move the plant 148 and the fertile material 404 into the plant holder 138. Accordingly, the plant holder 138 is a sanitary and convenient device for growing plants.

The covers 140 each incorporates a substantially semicircular opening 504. When the covers 140 are placed next to each other, the openings 504 form a substantially circular opening 144. Each of the covers 140 further incorporates a lip 502 on three sides of it. The lips 502 are disposed within the chamber formed between the plant holder 138 and the covers 140. The lips 502 prevents the covers 140 from sliding away from the plant holder 138.

To operate the plant holder 138, the user first place the plant container 402 inside the plant holder 138. She then places the covers 140 on the plant holder 138 from two sides of the plant 148. After the plant holders 138 are placed into the brackets 136, the user adjusts the angle of the lighting devices 116. When the devices 116 face straight down toward the plant holders 138, the plants 146 and 148 receive a higher amount of illumination from the lamps 118. To reduce the amount of illumination the plants 146 and 148 receive, the lighting devices can be tilted around the frame 112. The more the lighting devices 116 are tilted, the less illumination that the plants 146 and 148 receive respectively. As used herein, the plant holder 138 with the plant 148 is said to correspond to the lighting device directly above the plant holder 138, while the plant holder 138 with the plant 146 is said to correspond to the lighting device directly above the plant holder 138. The corresponding lighting device and plant holder are termed herein as a light plant pairs. Accordingly, the illustrative system 100 includes two light plant pairs.

Figure 6:
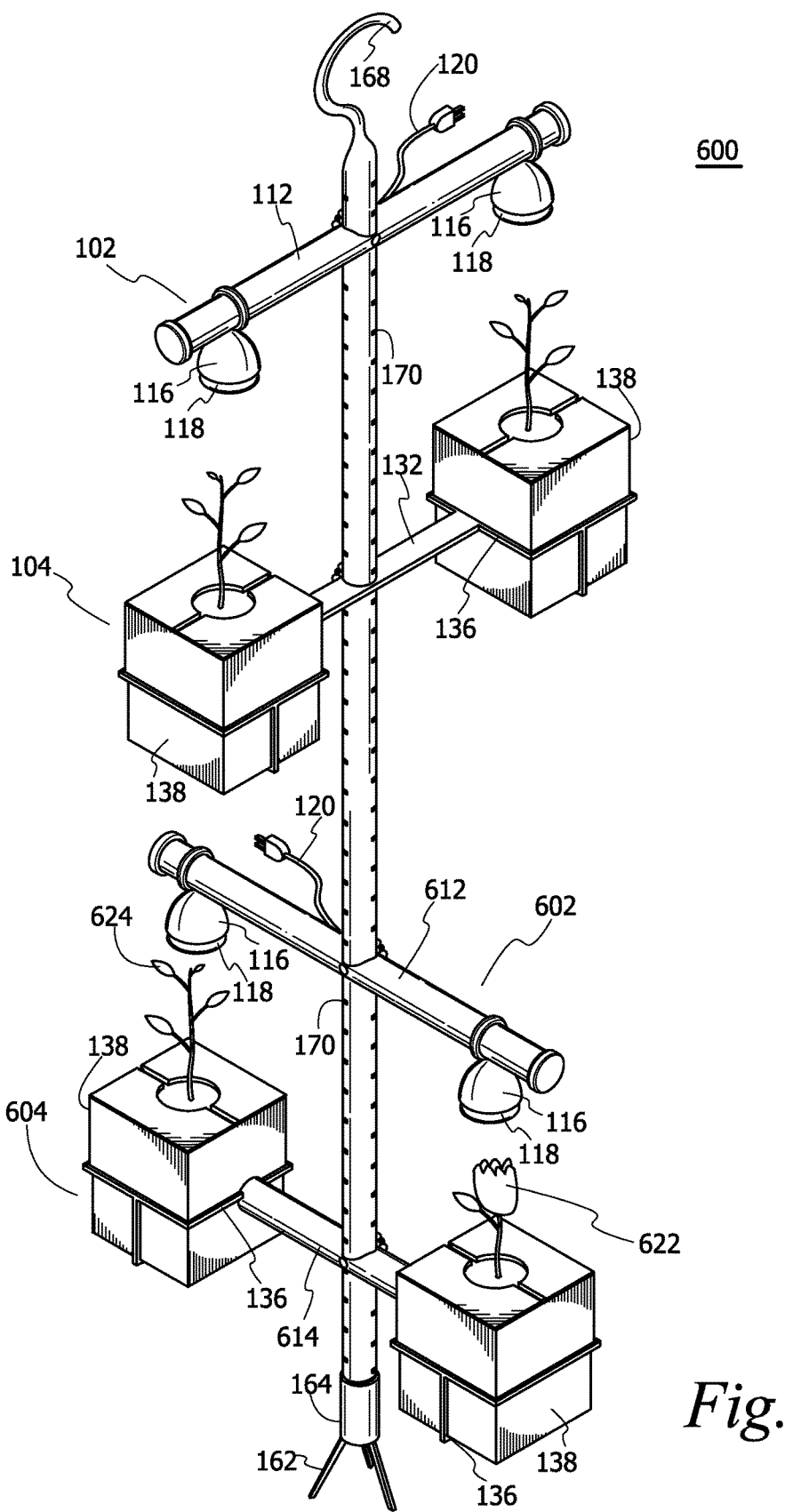
FIG. 6 is a front perspective view of a plant stand system with two lighting subsystems and two corresponding plant holder subsystem in accordance with the teachings of this disclosure.

Referring to FIG. 6, a plant stand with four light plant pairs are shown and generally indicated at 600. The plant stand 600 is an improved plant stand 100 with an additional light subsystem 602 and an additional plant holder subsystem 604. In one arrangement, the frame 612 of the light subsystem 602 is perpendicular to the frame 112, while the frame 614 of the plant holder subsystem 604 is perpendicular to the frame 132. In other words, the frame 112 is parallel to the frame 132; the frame 602 is parallel to the frame 604; and the frame 132 is perpendicular to the frame 604. As used herein, the light subsystem 102 is said to correspond to the plant holder subsystem 104; and the light subsystem 602 is said to correspond to the plant holder subsystem 604. The light subsystems 102 and 602 may share the same power cord 120 or use different power cords. The plant holder subsystem 604 houses two plants 622 and 624.

Figure 7:
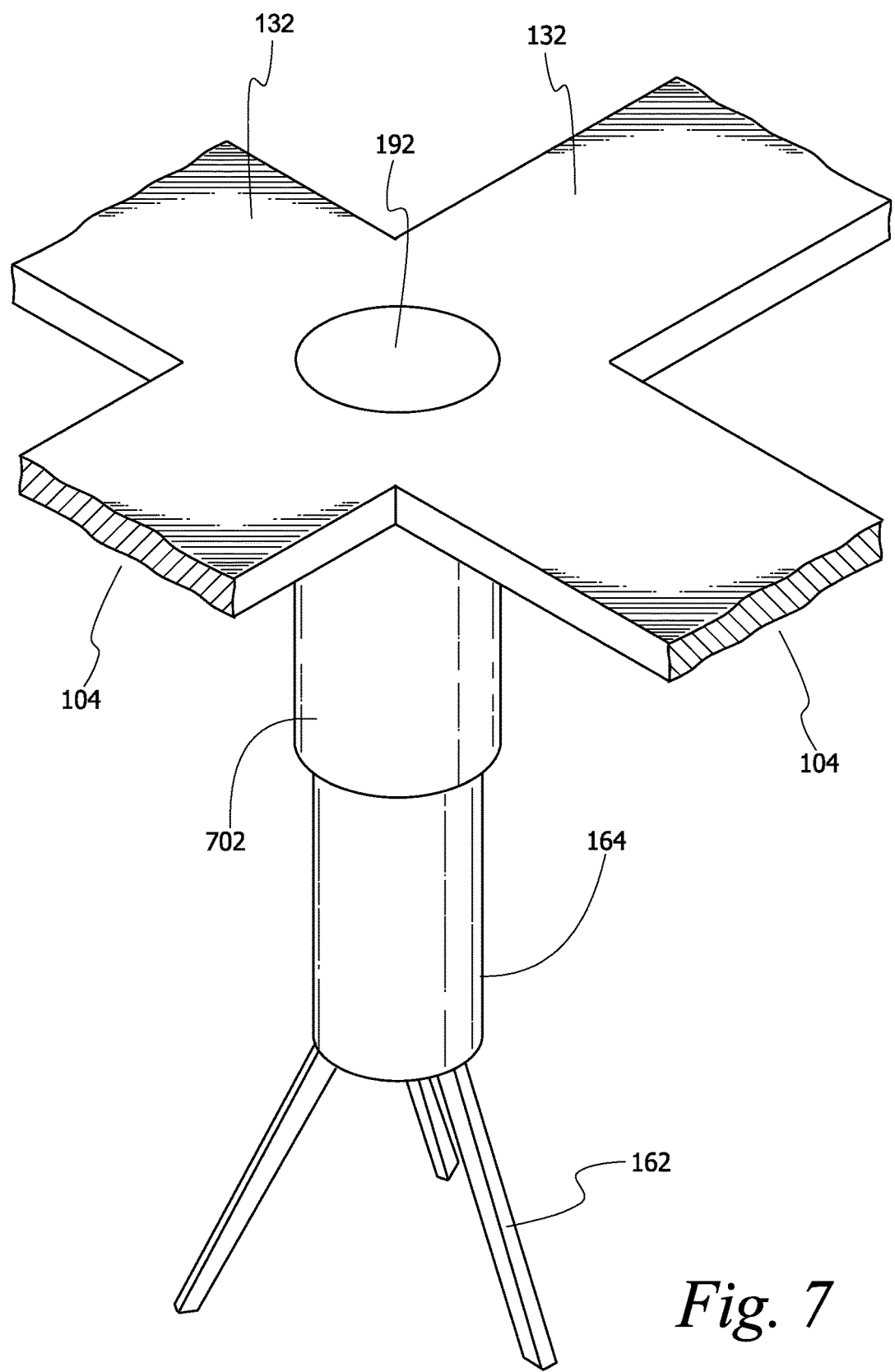
FIG. 7 is a front top perspective view of a partial plant stand system with two plant holder subsystems in accordance with the teachings of this disclosure.

Turning to FIG. 7, a partial view of an alternative embodiment of the plant stand 100 is shown. Two perpendicular plant holder subsystems 104 are shown. A cylindrical casing 702 is affixed to the bottom of the frame 132. The casing 702 is adapted to receive the stand body 164. When the body 164 is inserted into the casing 702, the frame 132 rests on top of the body 164. Through the aperture 192, the frame 108 is received by the body 164.

In a further implementation, a timer 152 is attached to the frame 112 or the frame 108. The timer 152 includes a pointer 154. The timer 152 controls the amount of time that the lamps 118 are on. For example, when the timer 152 is set to two and half hours (also referred to herein as an on-time), the lamps are turned off by the timer 152 after two and half hours. To set the on-time, a user turns the pointer 154 to the desired spot indicating the amount of time, such as one hour or four and half hours.

Obviously, many additional modifications and variations of the present disclosure are possible in light of the above teachings. Thus, it is to be understood that, within the scope of the appended claims, the disclosure may be practiced otherwise than is specifically described above. For example, the frame 112 is attached to the frame 108 without the aperture 184. As an additional example, the lighting device 116 is attached to the frame 112 using a bolt and a set of apertures in the frame 112 for adjusting the angle of the lighting device 116 relative to the frame 108. As still a further example, the light subsystem 102 includes more than two lighting devices 116; and the plant holder subsystem 104 includes more than two corresponding plant holders 138.

The foregoing description of the disclosure has been presented for purposes of illustration and description, and is not intended to be exhaustive or to limit the disclosure to the precise form disclosed. The description was selected to best explain the principles of the present teachings and practical application of these principles to enable others skilled in the art to best utilize the disclosure in various embodiments and various modifications as are suited to the particular use contemplated. It is intended that the scope of the disclosure not be limited by the specification, but be defined by the claims set forth below. In addition, although narrow claims may be presented below, it should be recognized that the scope of this invention is much broader than presented by the claim(s). It is intended that broader claims will be submitted in one or more applications that claim the benefit of priority from this application. Insofar as the description above and the accompanying drawings disclose additional subject matter that is not within the scope of the claim or claims below, the additional inventions are not dedicated to the public and the right to file one or more applications to claim such additional inventions is reserved.

What is claimed is:

1. A plant stand system comprising:
   i. a center frame;
   ii. a set of lighting subsystems, each lighting subsystem within said set of lighting subsystems including a lighting subsystem frame and a plurality of lighting devices attached to said lighting subsystem frame, said lighting subsystem frame attached to said center frame, each lighting device within said plurality of lighting devices adapted to receive a lamp;

iii. a set of plant holder subsystems corresponding to said set of lighting subsystems, each plant holder subsystem within said set of plant holder subsystems including a plant holder subsystem frame attached to said center frame, each plant holder subsystem within said set of plant holder subsystems adapted to support a plurality of plant holders corresponding to said plurality of lighting devices, each plant holder within said plurality of plant holders adapted to hold a plant receiving illumination from a corresponding lamp; and iv. a portable stand subsystem supporting said center frame.

2. The plant stand system of claim 1, wherein each lighting subsystem within said set of lighting subsystems includes a timer for controlling an amount of time when said lamp is on.

3. The plant stand system of claim 1, wherein:
i. said set of lighting subsystem includes a first lighting subsystem and a second lighting subsystem perpendicular to said first lighting subsystem; and
ii. said set of plant holder subsystems includes a first plant holder subsystem and a second plant holder subsystem perpendicular to said first plant holder subsystem, wherein said first plant holder subsystem corresponds to said first lighting subsystem and said second plant holder subsystem corresponds to said second lighting subsystem.

4. The plant stand system of claim 1, wherein each plant holder subsystem within said set of plant holder subsystems includes a plurality of brackets for supporting said plurality of plant holders.

5. The plant stand system of claim 4, wherein each plant holder within said plurality of plant holders:
i. receives a plant container containing said plant; and
ii. includes two covers incorporating two substantially semicircular openings respectively, wherein said two openings form a substantially circular opening for receiving said plant, wherein said two covers incorporate two respective lips for preventing said two covers from sliding away from said plant holder.

6. The plant stand system of claim 1, wherein said center frame incorporates a top end for attaching said plant stand system to a structure.

7. The plant stand system of claim 6, wherein said top end is one of a hook.

8. A plant stand system comprising:
i. a center frame;
ii. a set of lighting subsystems, each lighting subsystem within said set of lighting subsystems including a lighting subsystem frame and a plurality of lighting devices attached to said lighting subsystem frame, said lighting subsystem frame attached to said center frame, each lighting device within said plurality of lighting devices adapted to receive a lamp;
iii. a set of plant holder subsystems corresponding to said set of lighting subsystems, each plant holder subsystem within said set of plant holder subsystems including a plant holder subsystem frame attached to said center frame, each plant holder subsystem within said set of plant holder subsystems adapted to support a plurality of plant holders corresponding to said plurality of lighting devices, each plant holder within said plurality of plant holders adapted to hold a plant receiving illumination from a corresponding lamp;
iv. a stand subsystem supporting said center frame; and
v. wherein said center frame incorporates a set of apertures for receiving said lighting subsystem frame at different heights and receiving said plant holder subsystem frame at different heights, wherein said lighting subsystem frame and said plant holder subsystem frame are perpendicular to said center frame.

9. The plant stand system of claim 8, wherein each lighting subsystem within said set of lighting subsystems includes a timer for controlling an amount of time when said lamp is on.

10. The plant stand system of claim 8, wherein each lighting device within said plurality of lighting devices is adapted to tilt along said lighting subsystem frame for adjusting an amount of illumination that a corresponding plant receives.

11. A plant stand system comprising:
i. a center frame;
ii. a set of lighting subsystems, each lighting subsystem within said set of lighting subsystems including a lighting subsystem frame and a plurality of lighting devices attached to said lighting subsystem frame, said lighting subsystem frame attached to said center frame, each lighting device within said plurality of lighting devices adapted to receive a lamp;
iii. a set of plant holder subsystems corresponding to said set of lighting subsystems, each plant holder subsystem within said set of plant holder subsystems including a plant holder subsystem frame attached to said center frame, each plant holder subsystem within said set of plant holder subsystems adapted to support a plurality of plant holders corresponding to said plurality of lighting devices, each plant holder within said plurality of plant holders adapted to hold a plant receiving illumination from a corresponding lamp;
iv. a stand subsystem supporting said center frame; and
v. wherein each lighting device within said plurality of lighting devices is adapted to tilt along said lighting subsystem frame for adjusting an amount of illumination that a corresponding plant receives.

12. The plant stand system of claim 11, wherein each lighting subsystem within said set of lighting subsystems includes a timer for controlling an amount of time when said lamp is on.

* * * * *